United States Patent
Bragin et al.

(10) Patent No.: US 8,192,790 B2
(45) Date of Patent: Jun. 5, 2012

(54) ELECTRODES FOR GENERATING A STABLE DISCHARGE IN GAS LASER SYSTEMS

(75) Inventors: Igor Bragin, Goettingen (DE); Rustem Osmanow, Rosdorf (DE); Jürgen Bäumler, Osterode (DE); Michael Semling, Goettingen (DE)

(73) Assignee: Coherent GmbH, Göttingen (DE)

( * ) Notice: Subject to any disclaimer, the term of this patent is extended or adjusted under 35 U.S.C. 154(b) by 0 days.

(21) Appl. No.: 12/792,625

(22) Filed: Jun. 2, 2010

(65) Prior Publication Data
US 2010/0239748 A1    Sep. 23, 2010

Related U.S. Application Data

(63) Continuation of application No. 11/711,193, filed on Feb. 27, 2007, now Pat. No. 7,756,184.

(51) Int. Cl.
*H01S 3/097* (2006.01)
*H01S 3/03* (2006.01)
*H01S 3/00* (2006.01)
*H01S 3/083* (2006.01)

(52) U.S. Cl. ............ 427/126.4; 427/58; 427/126.1; 427/126.3; 427/256; 427/271; 427/287; 372/69; 372/85; 372/86; 372/87; 372/81

(58) Field of Classification Search ............ 372/86
See application file for complete search history.

(56) References Cited

U.S. PATENT DOCUMENTS

| | | | |
|---|---|---|---|
| 5,187,716 A * | 2/1993 | Haruta et al. | 372/57 |
| 5,302,414 A | 4/1994 | Alkhimov et al. | |
| 5,379,316 A | 1/1995 | Karube et al. | |
| 6,560,263 B1 | 5/2003 | Morton et al. | |
| 6,569,245 B2 | 5/2003 | Krysa et al. | |
| 6,650,679 B1 * | 11/2003 | Bragin et al. | 372/87 |
| 6,869,701 B1 * | 3/2005 | Aita et al. | 428/698 |
| 7,079,565 B2 | 7/2006 | Bragin et al. | |
| 2002/0094686 A1 * | 7/2002 | Gorczyca et al. | 438/690 |
| 2004/0066827 A1 * | 4/2004 | Steiger et al. | 372/87 |
| 2004/0131100 A1 | 7/2004 | Bragin et al. | |
| 2007/0002918 A1 * | 1/2007 | Niemoeller et al. | 372/55 |
| 2008/0192176 A1 * | 8/2008 | Aoyama | 349/65 |

FOREIGN PATENT DOCUMENTS

DE    4401892    *    7/1995

(Continued)

OTHER PUBLICATIONS

Machine Translation of Ko et al., KR 20050075092, (no date available).*

(Continued)

*Primary Examiner* — Michael Cleveland
*Assistant Examiner* — Lisha Jiang
(74) *Attorney, Agent, or Firm* — Morrison & Foerster LLP

(57) ABSTRACT

Arcing is minimized in a discharge chamber of a gas laser system by utilizing an electrode which comprises a surface portion capable of functioning as one of an anode and a cathode in order to energize a gas mixture in a discharge chamber of the gas discharge laser system, a shoulder portion being positioned on either side of the surface portion and being exposed to the gas mixture, and a coating layer made of electrically insulating material, wherein the coating layer is attached to the shoulder portion by a cold spraying method.

6 Claims, 3 Drawing Sheets

FOREIGN PATENT DOCUMENTS

| | | | |
|---|---|---|---|
| KR | 20050075092 | * | 7/2005 |
| WO | WO 2005109469 | * | 11/2005 |

OTHER PUBLICATIONS

Machine Translation of Buecher et al., DE 4401892, (no date available).*

T. Schmidt et al., "New Developments in Cold Spray Based on Higher Gas and Particle Temperatures," *Journal of Thermal Spray Technology*, vol. 15(4), Dec. 2006, pp. 488-494.

S. Steinle, "Coating technology with new possibilities," *Design [Periodical for Product Development and Engineering Materials]*, Hannover Exposition (Apr.) 2003, 2 pages in length (w/4-page English translation).

* cited by examiner

Prior Art

ELECTRODES FOR GENERATING A STABLE DISCHARGE IN GAS LASER SYSTEMS

PRIORITY

This application is a continuation of U.S. patent application Ser. No. 11/711,193 (now U.S. Pat. No. 7,756,184) filed Feb. 27, 2007.

TECHNICAL FIELD

The subject invention relates to improved electrodes for use in gas lasers such as excimer lasers.

BACKGROUND

In a conventional discharge chamber of a gas laser system, a pair of electrodes connected to a discharge circuit imparts electrical energy to a gas mixture volume located between the electrodes. The energizing of the gas mixture volume results in an excitation of the atoms and/or molecules in the gas mixture volume. The atoms and/or molecules remain in the excited state only for a very short period of time, i.e., roughly $10^{-8}$ seconds and a stimulated emission takes place if certain prerequisites are fulfilled. The stimulated emission leads to the generation of coherent radiation. In order to obtain a highly directionally orientated light beam, the discharge chamber is positioned within a resonator which is an optical feedback system and which usually comprises two mirrors. The mirrors are arranged on opposite sides of the resonator, thus forcing the radiation to oscillate within the resonator. One of the mirrors is totally reflective while the other allows a fraction of the light to escape from the resonator, e.g., through a partially transparent section, thereby forming a laser beam.

Many gas laser systems produce short excitation pulses, leading to laser pulses of 10 ns to 30 ns. For improving the spatial uniformity of the gas discharge, the gas mixture volume is preionized by using, for example, preionization pins. The preionization pins are placed close to the electrodes and generate a spark discharge some 10 ns before the main gas discharge. The sparks produce ultraviolet radiation which is sufficient to preionize the gas mixture volume between the electrodes with a homogeneous initial seed density of about $10^8$ electrons/cm$^3$.

Many applications, for example optical microlithography for forming small electronic structures on silicon substrates, require gas laser systems to be run at high power, while maintaining a necessarily high repetition rate of the laser pulses. This is achieved by utilizing discharge chambers having a compact design. Compactly designed discharge chambers, however, tend to promote arcing which is not suitable for the generation of a laser beam and which damages the discharge chambers' electrodes.

Usually, the electrodes have a conductive structure comprising an extending ridge (sometimes referred to as a "nose portion") and opposed shoulder portions. The protruding ridge portion is used to maintain the appropriate gap distance between the cathode and anode electrodes and to separate the bulk of the electrode bodies from each other. This separation can help to prevent arcing between, for example, shoulder portions of opposing electrodes, as well as from preionization pins to shoulder regions of the electrodes.

However, the use of a protruding ridge portion cannot guarantee the absence of arcing. Additionally, the protruding ridge portion can have a strong influence on the flows of the gas mixture between the electrodes. An optimized gas flow with higher gas speeds, such as on the order of about 30-50 m/s, can be necessary for a high repetition rate laser over 4 kHz. Due to unavoidable chemical reactions between the gas mixture and materials of the gas laser system as well as electrode burn-off, both causing solid and gaseous impurities, the gas mixture must be continuously cleaned by special gas filters. Furthermore, an optimized gas flow is necessary to lead away the excess heat produced during the laser beam generation process.

An improved approach that can be used to avoid arcing, while improving the gas flow between the electrodes, is disclosed in U.S. Pat. No. 7,079,565, assigned to the common assignee of this application. As described in this patent, a ceramic spoiler is placed at each shoulder region of an electrode, to act as an insulating barrier over the shoulder portion of the electrode. The outer surface of each ceramic spoiler has a shape that is optimized to improve the flow of gas between the electrodes. For mounting a ceramic spoiler to the electrode, the ceramic spoiler comprises a projecting tongue which is received in a channel of the electrode. The projecting tongue is biased against the sides of the channel by a spring mounted in the channel so that the ceramic spoiler is held in a stationary position with respect to the electrode.

One drawback to the use of ceramic spoilers of this type is that the ceramic spoilers have a certain minimal thickness due to the manufacturing process and mounts needed to connect the spoilers to the electrodes. Thus, the necessary minimal thickness of the ceramic spoilers sets a minimal limit for the dimensions of the discharge chamber. Furthermore, the necessity for a mount increases manufacture and material costs.

Accordingly, it would be desirable and highly advantageous to have an avenue to minimize the occurrence of arcing in a discharge chamber of a gas discharge laser system, and yet not to set a minimal limit for the discharge chambers' dimensions.

Therefore, an aspect of the present invention is to provide an electrode for a gas discharge laser system which minimizes the occurrence of arcing in the discharge chamber while not limiting the reduction of the discharge chambers' size.

A further aspect of the present invention is to provide an electrode for a gas discharge laser system which involves lower manufacture and material costs than an electrode having separate ceramic spoilers.

A still further aspect of the present invention is to provide an electrode for a gas discharge laser system which improves the preionization of the gas mixture volume and which is less subject to erosion, thereby allowing for a better long-term stability of the gas discharge.

SUMMARY OF THE INVENTION

In accordance with these and other objects, an electrode assembly for a gas laser is disclosed which includes a pair of opposed electrodes arranged in face to face relationship leaving a gap therebetween. In operation, electrical power is applied to the electrodes cause a gas discharge to be struck in the gap.

In accordance with the subject invention, at least one of said electrodes is partially coated with a non-porous ceramic material layer. Preferably, the layer is relatively thin, having a thickness less than 1 mm.

In one preferred embodiment, the electrodes have a generally hemispherical configuration, with a narrow central surface portion and opposed shoulder portions flanking the central surface portion. In this configuration, the ceramic material coating layer is applied to the shoulder portions. In one embodiment, the central surface portion is raised to define a ridge or nose. In this case, it is preferably to match the thickness of the ceramic layer to the height of the ridge so that electrode has a smooth surface.

In another aspect of the subject invention, the central surface portion is provided with an average roughness of 100 microns. Roughening the surface portion increases the surface area of the active electrode region improving performance.

For a more complete understanding of the present invention and its features and advantages, reference is made to the following description, taken in conjunction with the accompanying drawings, in which:

DETAILED DESCRIPTION OF THE PREFERRED EMBODIMENT

Figure 1:
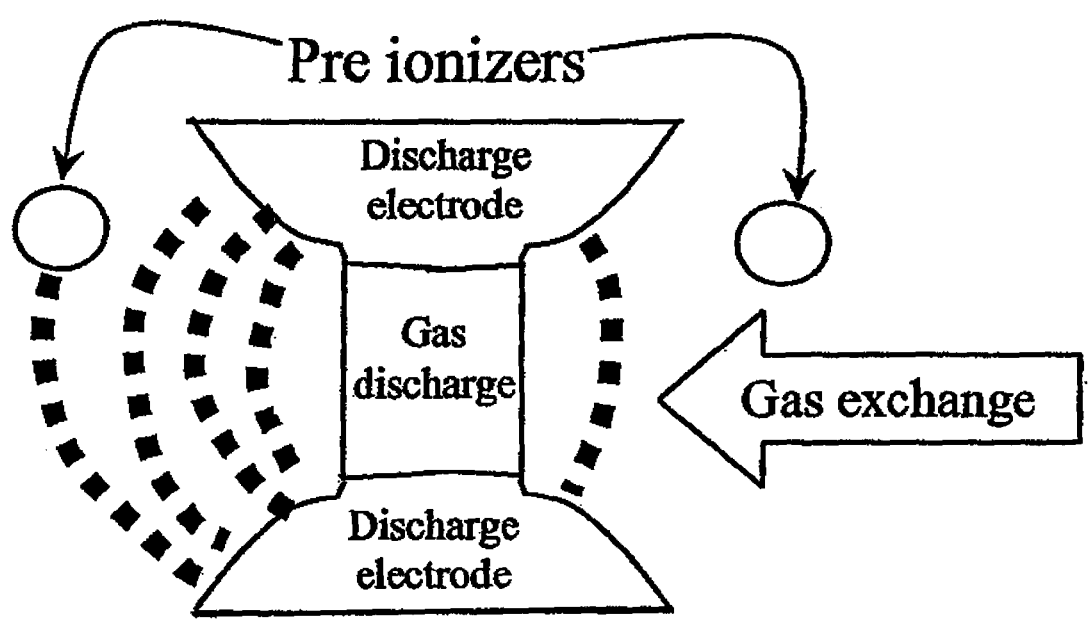
FIG. 1 illustrates schematically a cross-sectional view of a prior art discharge chamber.

FIG. 1 illustrates schematically a cross-sectional view of a prior art discharge chamber. The drawing shows an upper and a lower electrode. Between the opposite electrodes the volume in which the gas discharge takes place is depicted. On each side of the upper electrode, a preionization pin is shown. The dashed lines illustrate typical forms of arcing which may occur in a prior art discharge chamber. As is sketched in the drawing, arcing may occur between shoulder portions of opposite electrodes as well as between a preionization pin and the opposing electrode's shoulder portion.

Figure 2:
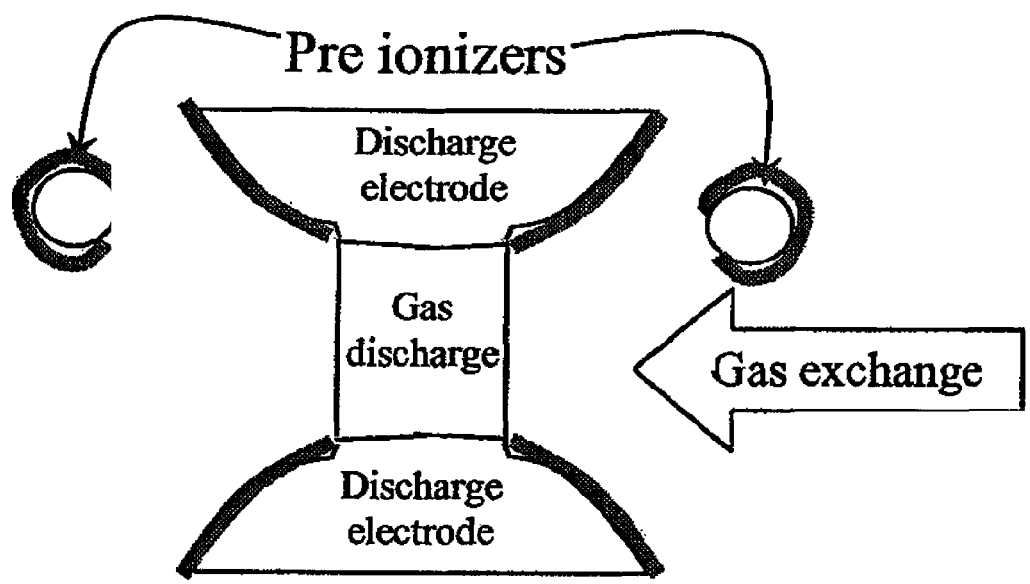
FIG. 2 illustrates schematically the surface regions of a discharge chamber according to an embodiment of the present invention which are preferably coated with an insulating material.

FIG. 2 illustrates schematically the surface regions of a discharge chamber according to an embodiment of the present invention which are preferably coated with an insulating material. The electrically insulating coating layers are schematically depicted by bold lines. It will be apparent to a person skilled in the pertinent art that each coating layer is completely attached to the respective surface region. Besides the shoulder portions of the electrodes, it is also possible to coat the surfaces of the preionization pins so that arcing between a preionization pin and the opposing electrode's shoulder portion is prevented while preionization of the gas mixture is still possible.

The coating layer made of electrically insulating material acts as an insulating barrier over the shoulder portion of the electrode so that no arcing can occur on the shoulder portion. The thickness of the coating layer is preferably less than about 1 mm, and more preferably about 0.5 mm. Therefore, the thickness of the coating layer is negligible with respect to the dimensions of the electrode so that the coating layer does not set a limit for the reduction of the electrode's size, and thus the size of the discharge chamber.

The electrically insulating material is preferably a ceramic material. Ceramic materials are capable of resisting the aggressive gases contained in a gas mixture of a gas discharge laser system. Preferably, the ceramic material is aluminium (III) oxide. However, other ceramic materials may also be used, for example, zirconium(IV) oxide.

The ceramic material is preferably coated onto the shoulder portion by using a cold spraying method, such as is available from CGT—Cold Gas Technology GmbH with offices in D-84539 Ampfing, Germany, and which is described in the article "Beschichtungs-Technologie mit neuen Möglichkeiten" published in Konstruktion, Apr. 4, 2003.

An electrode having a coating layer made of ceramic material is considerably less complex in structure and manufacture than an electrode with ceramic spoilers so that manufacture and material costs are reduced. Especially, the use of a cold spraying method simplifies the coating process and lowers the costs. Furthermore, a cold spraying method allows for a precise control of the areas of the electrode's surface which are to be coated, and also sets fewer restrictions due to the coating process on the selection of the areas.

Figure 3:
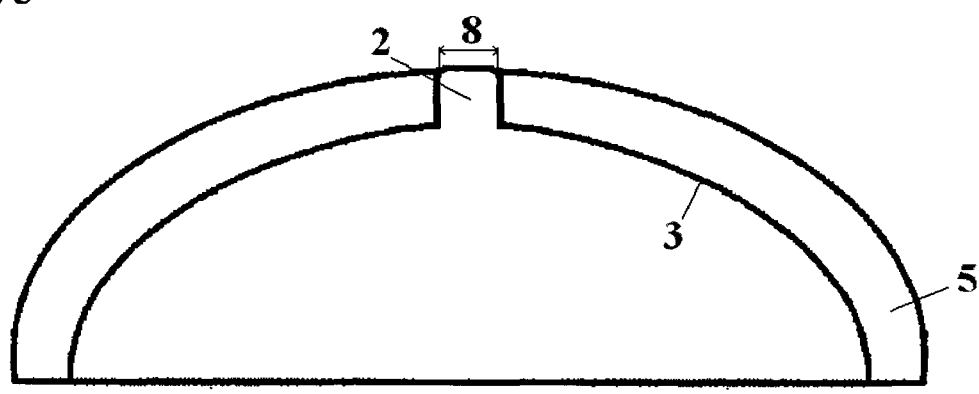
FIG. 3 illustrates schematically a cross-sectional view of an electrode according to an embodiment of the present invention having a ridge or nose portion.

FIG. 3 illustrates schematically a cross-sectional view of an electrode according to an embodiment of the present invention. In this embodiment of the present invention, the electrode includes a conductive structure comprising a ridge or nose portion 2 and a shoulder portion 3. The nose portion 2 runs the entire length of the electrode, or a portion of the electrode's length. For gas discharge laser systems with repetition rates of 1-6 kHz, the nose portion 2 preferably is on the order of 1-4 mm in width and 2-4 mm in height. Gas discharge laser systems with repetition rates of 6 kHz or higher preferably use electrodes having a nose portion 2 the width of which is on the order of 1 mm or lower, with a height on the order of about 2 mm.

The shoulder portions 3 are positioned on either side of the nose portion 2. An electrically insulating coating layer 5 is coated onto the electrode's shoulder portion 3. Next to the nose portion 2, the thickness of the coating layer 5 is substantially equal to the height of the nose portion 2 so that the coating layer 5 is approximately flush with the upper surface of the nose portion 2. The upper surface of the nose portion 2 is bounded by the coating layer 5 and forms a surface portion 8. The surface portion 8 is capable of functioning as one of an anode and a cathode in order to energize a gas mixture in a discharge chamber of a gas discharge laser system. An advantage of this embodiment of the present invention is the fact that the flow of the gas mixture between opposing electrodes is not negatively influenced by irregularities in the electrode's surface. Furthermore, an electrode according to this embodiment of the present invention shows an improved resistance to temporal changes of its shape and size, which leads to a better long-term stability of the gas discharge.

The surface portion 8 is preferably treated by sandblasting with jets of steel grit to obtain an average surface roughness of substantially at least 100 μm, whereby the energizing of the gas mixture is improved.

Figure 4:
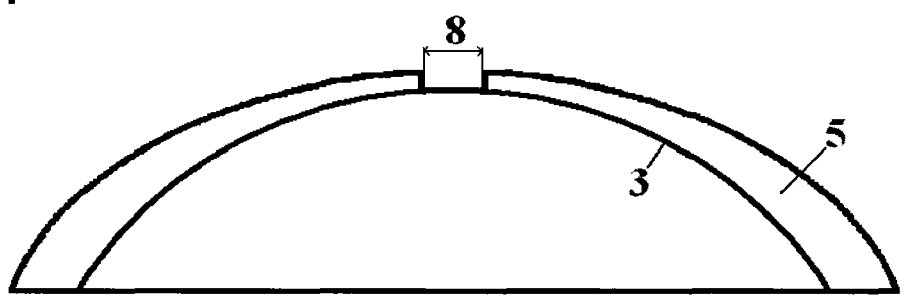
FIG. 4 illustrates schematically a cross-sectional view of an electrode according to an embodiment of the present invention without a nose portion.

FIG. 4 illustrates schematically a cross-sectional view of an electrode according to a preferred embodiment of the present invention without a nose portion. In this embodiment of the present invention, the electrode's surface is coated with an electrically insulating coating layer 5. At the apex of the electrode, the coating layer 5 comprises a gap leaving a surface portion 8 of the surface of the electrode's conductive structure uncoated. The surface portion 8 is capable of functioning as one of an anode and a cathode in order to energize a gas mixture in a discharge chamber of a gas discharge laser system. The thickness of the coating layer 5 is preferably less than about 0.5 mm at the bounds of the surface portion 8 and increases to about 0.5 mm to 1 mm in the region of the electrode's shoulder portion 3. An advantage of this embodiment of the present invention is its simple geometry. The absence of a nose portion simplifies the manufacture of an electrode according to this embodiment of the present invention which contributes to cost effectiveness. The region of the electrode's surface which forms the surface portion 8 is preferably treated by sandblasting with jets of steel grit to obtain an average surface roughness of substantially at least 100 μm, whereby the energizing of the gas mixture is improved. Furthermore, an electrode according to this embodiment of the present invention shows an improved resistance to temporal changes of its shape and size, which leads to a better long-term stability of the gas discharge.

Surface Roughness of Electrodes

In the article of C. Yamabe, T. Matsuchita, S. Sato, and K. Horii, published in J. Appl. Phys., 1980, Vol. 51, N2, p. 898, it is shown that 80% of the initial electrons of a gas discharge in a gas discharge laser system, which are provided by preionization, result from the photoelectric effect at the surface of the electrode.

A skilled person in knowledge of the present invention will appreciate that enlargement of the electrode's surface increases the number of the initial electrons, and thus improves the energizing of the gas mixture. While leaving the shape and size of the electrode untouched, an enlargement of the electrode's surface is achieved in accordance with an embodiment of the present invention by increasing the surface roughness. An average surface roughness of substantially at least 100 μm has been proven to be best.

For attaining a surface roughness of substantially at least 100 μm, the surface portion is preferably treated by sandblasting with jets of steel grit. Alternatively, the surface portion may be subject to a chemical etching process.

A further advantage of an increased surface roughness is the effect that the surface comprises tiny peaks each of which having a higher electrical field than a smooth surface has. The increased electrical field of the peaks results in a reduced breakdown voltage of the surface, i.e., the surface portion, so that possible arcing primarily occurs on this portion of the electrode's surface. The concentration of possible arcing on the surface portion, thus, leads to a reduced temporal change of the electrode's shape and size, since the surface structure of a surface with higher surface roughness is less influenced by, for example, breaking out of material due to electrode burn-off than the surface structure of a smooth surface. Hence, an electrode according to this embodiment of the present invention shows an improved resistance to temporal changes of its shape and size, which leads to a better long-term stability of the gas discharge.

An electrode according to an embodiment of the present invention is preferably used in a gas laser system, comprising a resonator including therein a discharge chamber filled with a gas mixture, and a pair of electrodes in the discharge chamber and connected to a discharge circuit for energizing the gas mixture and generating a laser pulse.

Using electrodes according to an embodiment of the present invention in a gas laser system allows for building a compactly designed discharge chamber, and thus a gas laser system having high repetition rates and improved laser beam parameters, such as, for example, pulse energy, and pulse-to-pulse stability. Furthermore, the lifetime of the gas laser system is increased.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

We claim:

1. A method of forming an electrode for exciting a gas in an excimer laser to create a discharge comprising the steps of:
   providing an elongated metal electrode where the surface exposed to the gas discharge has a hemispherical configuration in cross section and wherein the hemispherical surface is defined by a continuous smooth arc; and
   spray coating a thin layer of non-porous ceramic material over the entire hemispherical surface of the electrode except for a narrow central region at the center of the hemispherical surface and wherein the thickness of the layer is less than 1 mm.

2. A method as recited in claim 1, wherein the thickness of the coating increases from the central region to the outer side edges of the hemispherical surface.

3. A method as recited in claim 1, further including the step of roughening the central region to achieve an average surface roughness of about 100 microns.

4. A method as recited in claim 3, wherein said roughening is performed by sandblasting the central region by a jet of steel grit.

5. A method as recited in claim 1, wherein the ceramic material is aluminum (III) oxide.

6. A method as recited in claim 1 wherein the thin layer is sprayed on the electrode with a cold spraying technique.

* * * * *